United States Patent [19]

Condit et al.

[11] Patent Number: 4,741,973
[45] Date of Patent: May 3, 1988

[54] SILICON CARBIDE ABRASIVE PARTICLES HAVING MULTILAYERED COATING

[75] Inventors: David A. Condit, Avon; Harry E. Eaton, Woodstock, both of Conn.

[73] Assignee: United Technologies Corporation, Hartford, Conn.

[21] Appl. No.: 941,902

[22] Filed: Dec. 15, 1986

[51] Int. Cl.⁴ .............................................. B32B 15/00
[52] U.S. Cl. ................................... 428/553; 428/570; 416/241 R
[58] Field of Search ............... 419/35, 64; 428/553, 428/557, 559, 570; 427/214; 416/241 R

[56] References Cited

U.S. PATENT DOCUMENTS

| | | | |
|---|---|---|---|
| 3,338,688 | 8/1967 | Longo | 428/570 |
| 3,533,824 | 10/1970 | Terrill et al. | 428/570 |
| 3,914,507 | 10/1975 | Fustukian . | |
| 4,148,494 | 4/1979 | Zelahy et al. | 428/559 |
| 4,184,853 | 1/1980 | Otopkov et al. | 427/214 |
| 4,249,913 | 2/1981 | Johnson et al. . | |
| 4,291,089 | 9/1981 | Adamovic . | |
| 4,309,457 | 1/1982 | Kawasumi et al. . | |
| 4,374,173 | 2/1983 | Adamovic . | |
| 4,406,667 | 9/1983 | Sarin et al. . | |
| 4,406,668 | 9/1983 | Sarin et al. . | |
| 4,406,669 | 9/1983 | Sarin et al. . | |
| 4,406,670 | 9/1973 | Sarin et al. . | |
| 4,409,003 | 10/1983 | Sarin et al. . | |
| 4,409,004 | 10/1983 | Sarin et al. . | |
| 4,421,525 | 12/1983 | Sarin et al. . | |
| 4,440,547 | 4/1984 | Sarin et al. . | |
| 4,505,720 | 3/1985 | Gabor et al. . | |
| 4,610,320 | 9/1986 | Beakley | 419/64 |
| 4,610,698 | 9/1986 | Eaton et al. . | |

FOREIGN PATENT DOCUMENTS

| | | | | |
|---|---|---|---|---|
| 4643459 | 12/1971 | Japan | | 427/214 |
| 6046962 | 3/1985 | Japan | | 75/244 |
| 730468 | 4/1980 | U.S.S.R. | | 428/570 |

Primary Examiner—John F. Terapane
Assistant Examiner—Eric Jorgensen
Attorney, Agent, or Firm—James M. Rashid

[57] ABSTRACT

Ceramic particles useful as abrasives in a metal matrix layer are described. The particles are coated with an oxide monolayer and a metal duplex layer. Preferably, the particles are silicon carbide; the oxide monolayer is aluminum oxide, and the metal duplex layer is a nickel-boron alloy over pure nickel.

9 Claims, 2 Drawing Sheets

SILICON CARBIDE ABRASIVE PARTICLES HAVING MULTILAYERED COATING

TECHNICAL FIELD

This invention relates to ceramic particles. More specifically, it relates to silicon carbide abrasive particles having a multilayered coating, and which are particularly useful in an abrasive layer on a gas turbine engine blade.

BACKGROUND

Gas turbine engines and other turbomachines have rows of blades which rotate within a generally cylindrical case. As the blades rotate, their tips move in close proximity to the internal wall surface of the case. To maximize engine operating efficiency, leakage of the gas or other working fluid between the blade tips and the case should be minimized. As has been known for some time, this may be achieved by blade and seal systems in which the blade tips rub against a seal attached to the case interior. Generally, the blade tip is made to be harder and more abrasive than the seal so that the tip cuts into the seal during those portions of the engine operating cycle when they contact each other.

Abrasive blade tips which are particularly useful in the high temperature section of gas turbine engines are described in commonly assigned U.S. Pat. Nos. 4,249,913 to Johnson et al, entitled "Alumina Coated Silicon Carbide Abrasive" and 4,610,698 to Eaton et al entitled "Abrasive Surface Coating Process for Superalloys". The contents of both patents are incorporated by reference. According to the Johnson et al invention, silicon carbide abrasive particles of about 200–750 microns (8–30 mils) average diameter are coated with a metal oxide such as alumina and incorporated by powder metal techniques in nickel or cobalt base matrix alloys. A powder metal compact containing up to about 45 volume percent of these ceramic particles may be made which is then bonded to the tip of the blade. According to the Eaton et al invention, a single layer of alumina coated silicon carbide abrasive particles, having a metal coating thereon, are first disposed on the blade tip surface in spaced apart relation, and then sintered to the blade tip surface by heating to a high temperature. A matrix material is then applied over the particles by plasma spraying. According to Eaton, the metal coating on the particles is deposited by an electroless nickel plating process.

Notwithstanding the advances described in these two patents, further improvements are needed in order to fabricate abrasive layers used on blades which operate in advanced turbine engines. One area in which improvement is sought relates to methods for increasing the bond strength between the abrasive particles and the blade tip. When the abrasive layer is made in accordance with the Eaton patent, a high strength bond is especially needed during the application of the plasma sprayed matrix layer.

SUMMARY OF THE INVENTION

This invention relates to coated ceramic particles useful as abrasive dispersoids in metal matrices. In particular, it relates to coated silicon carbide ceramic particles especially suited for use in a metal matrix abrasive layer on the tip surface of a superalloy turbine blade which operates at service temperatures which range from about 815° C. (1,500° F.) to about 1,100° C. (2,010° F.). According to the invention, the ceramic particles are characterized by a multiple layer coating; the first coating layer is resistant to diffusion or dissolution with the ceramic at temperatures up to at least the maximum service temperature of the superalloy, and prevents any reaction between the ceramic and the matrix material it is dispersed within. The first coating layer also prevents any reaction between the ceramic and the superalloy. The second coating layer has a melting temperature above the maximum service temperature of the superalloy and is resistant to dissolution or diffusion with the first coating layer at temperatures up to at least the maximum service temperature. The second coating layer is also compatible with the matrix material and with the superalloy; i.e., no undesired phases are formed if the second coating layer diffuses with the matrix or with the superalloy. The third coating layer is also compatible with the matrix material and the superalloy, and has a melting temperature less than the melting temperature of the second coating layer, and less than at least about 1,095° C. (2,000° F.). The third coating layer is capable of significant diffusion into the superalloy at temperatures below about 1,095° C. If the third layer is melted, it wets the second coating layer.

The preferred ceramic particles in this invention are silicon carbide, and the preferred coating layers are as follows: first layer, aluminum oxide; second layer, nickel; third layer, a nickel boron alloy. Therefore, it is seen that the preferred ceramic particles are silicon carbide with an oxide coating layer (aluminum oxide) and a duplex metal coating layer (nickel-boron over nickel).

The method by which an abrasive layer on a superalloy turbine blade tip is fabricated using the oxide and metal coated ceramic particles of this invention is as follows: adhere a single layer of the ceramic particles in spaced apart relation on the tip surface of the blade; heat the blade to cause diffusion of the nickel-boron coating on each particle into the blade surface, whereby a high strength sinter bond is formed between each particle and the blade; deposit matrix material onto the tip surface and over the particles sintered thereto by a plasma spray process; hot isostatically press the matrix layer to close any voids therein; and treat the surface of the matrix so that the ceramic particles protrude above the matrix surface. The abrasive layer made in this manner is capable of operating at temperatures up to at least about 1,100° C., and has very good abrasive characteristics.

The foregoing and other features and advantages of the invention will become more apparent from the following description of preferred embodiments and accompanying drawings.

BEST MODE FOR CARRYING OUT THE INVENTION

The invention is described with reference to the fabrication of an abrasive layer on a gas turbine engine blade tip, which rubs ceramic or metal air seals and operates at maximum service temperatures of about 1,000° C. Those skilled in the art will recognize that the invention may be useful in other similar rubbing applications.

Figure 1:
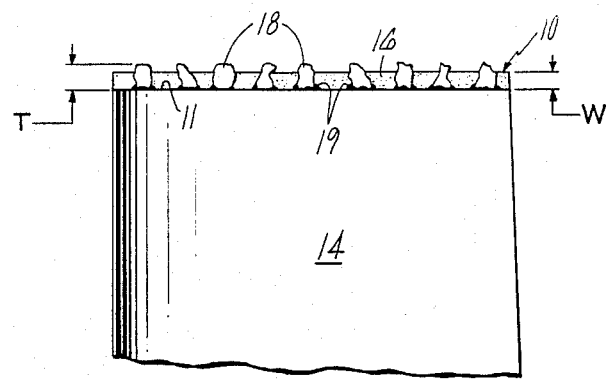
FIG. 1 shows in cross section the radially outer portion of a typical gas turbine blade having an abrasive layer made according to the invention.

Referring to FIG. 1, the abrasive layer 10 on the tip surface 11 of a gas turbine blade 14 contains coated ceramic particles 18 in a matrix 16. The blade 14 can be made of a nickel base superalloy such as is described in commonly assigned U.S. Pat. No. 4,209,348 to Duhl et al.

The abrasive layer 10 is subject to high stresses during engine operation, and therefore it is important that the layer 10 have a certain configuration and properties so as to perform its function. In particular, the bond strength between particles 18 and the tip surface 11 must be high so that the particles are not lost from the surface 11 during fabrication of the abrasive layer 10, or during operation of the engine.

The abrasive layer 10 made according to the invention is characterized by a single layer of closely spaced ceramic particles 18 surrounded by matrix material 16, generally in accordance with the layer shown in the aforementioned patent to Eaton. The matrix metal 16 has a thickness W which is preferably about 50–90% of the overall thickness T of the particles 18. As a result, a portion of each particle 18 projects into space, and above the matrix 16. For the best operating characteristics, the unexposed portion of the particles 18 must be surrounded by matrix metal 16, and the particles 18 must be closely spaced apart from each other. In the blade tip made in accordance with the invention, each abrasive particle 18 is sinter bonded to the blade tip 11 prior to application of the matrix material 16, and the majority (preferably at least about 80–90%) of the particle surface area (excluding that surface area exposed above the matrix 16) is surrounded by the metal matrix 16 rather than being in contact with other particles 18. Thus, the particles 18 are all securely joined to the blade tip 11. Also, the particles 18 are, in general, evenly and densely spaced apart on the blade tip 11. Densities of about 30–130 particles per $cm^2$ (200–840 particles per $in^2$) of tip surface 11 are preferred, with about 75 particles per $cm^2$ (485 particles per $in^2$) being most preferred. Hot pressed and crushed silicon carbide particles having a nominal size of about 200–750 microns have been found to be particularly useful in the practice of the invention, although other sizes in the range of about 25–1,250 microns might also be useful. Other ceramics with good high temperature strength, such as silicon nitride, SiAlON (silicon-aluminum-oxygen-nitrogen), and aluminum oxide, may also be used. If the temperatures at which the abrasive layer is used are low, ceramics such as cubic boron nitride or diamond might also be useful. Regardless of whether the expected use is at high or low temperatures, the ceramic must have good abrasive characteristics.

Figure 2:
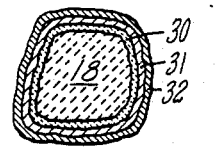
FIG. 2 shows in cross section the coated ceramic particles useful in the invention.

Each of the ceramic particles 18 is coated with a multiple layer coating, as shown in FIG. 2. The first coating layer 30 is a ceramic (preferably metal oxide) coating which is stable at elevated temperatures; this coating prevents the particles 18 from dissolving or diffusing with the blade tip 11 alloy during the elevated sintering (bonding) operation. It also prevents the particles from reacting with the blade tip 11 and matrix material 16 during the lifetime of the abrasive layer 10. An aluminum oxide coating is preferably used as the oxide coating layer on silicon carbide particles, since such particles readily dissolve in nickel base alloys at high temperatures. See the aforementioned Johnson et al patent. Other stable oxide coatings may also be used. If the ceramic particles 18 are inherently resistant to reaction with the blade or matrix alloy at elevated temperatures, the oxide coating 30 may not be necessary. When aluminum oxide is used, it should be about 5–25 microns (0.2–1 mils) thick. As shown in FIG. 2, the coating 30 should substantially encapsulate the silicon carbide particle 18 to best prevent dissolution and/or diffusion of the particles 18 in the matrix 16 or with the blade tip 11.

The second and third coating layers 31 and 32, respectively, comprise a duplex metal coating. The second coating layer 31 has a melting temperature in excess of the maximum service temperature of the abrasive layer 10. Also, the second layer 31 is resistant to diffusion or dissolution with the oxide coating layer 30 at temperatures up to at least the maximum service temperature. The second layer 31 is capable of diffusion with the blade alloy and matrix material 16, and no undesired phases form when such diffusion takes place. The preferred second coating layer 31 is pure nickel, about 2–8 microns (0.08–0.3 mils) thick, and is applied by chemical or physical vapor deposition, electrolytic or electroless plating techniques. Pure nickel melts at a temperature of about 1,455° C. (2,650° F.). Transition metals such as cobalt or chromium, and high melting temperature noble metals such as platinum, may also be used as the layer 31, as may alloys containing nickel, cobalt, chromium, platinum, etc. The melting temperature of the layer 31 should be at least about 1,260° C. (2,300° F.). The second coating layer 31 substantially encapsulates the first (oxide) coating layer 30.

The third coating layer 32 is the most important layer of the coated ceramic, with respect to the formation of the high strength sinter bond between the particles 18 and the blade tip 11. The third coating layer 32 is capable of significant diffusion into the tip surface 11 of the blade 14 during a high temperature sintering operation. The layer 32 is compatible with the second layer 31, and with the blade and matrix alloy, i.e., does not form any phases or compounds which would degrade their properties. The third layer 32 is selected from the group consisting of transition metals, high melting temperature noble metals, or alloys thereof, which contain a melting point depressant such as boron or silicon. The melting point depressant is present in sufficient quantity so that the third layer 32 melts at a temperature which is at least about 150° C. (270° F.) less than the melting temperature of the second coating layer 31. The third layer should have a melting temperature less than about 1,095° C. (2,000° F.). Preferably, the base metal (or base alloy) of the third coating layer is the same as the metal (or alloy) which comprises the second coating layer. Therefore, if the second coating layer is nickel, the third coating layer is nickel plus a melting point depressant. If the third coating layer is a nickel-boron alloy, it should be 2–8 microns (0.008–0.3 mil) thick, containing between about 1–5 weight percent boron and applied by electroless plating. About 3.5 percent boron is the most preferred composition; such an alloy has a melting temperature of about 1,080° C. (1,980° F.). As is seen in FIG. 2, the third layer 32 substantially encapsulates the second layer 31.

The nickel-boron/nickel duplex metal layer is a particularly desired duplex metal layer combination. If the nickel-boron layer 32 is ever melted during the fabrication of the abrasive layer 10, it will wet the surface of the nickel layer 31, rather than beading up on the nickel layer 31. When the melted nickel-boron layer 32 solidifies, the sinter bond between the particles 18 and blade tip 11 will reform.

For optimum abrasive characteristics, the coated ceramic particles 18 are deposited onto the blade tip surface 11 in closely spaced relation to each other. A density of about 75 particle per cm$^2$ is desired. The preferred practice for depositing the particles 18 onto the tip surface 11 is discussed in more detail in the copending and commonly assigned application "Method for Depositing a Layer of - Abrasive Material on a Substrate", U.S. Ser. No. 842,591 to Vontell et al, which is incorporated by reference. In order to initially affix the particles 18 to the blade tip surface 11 (i.e., before the sintering operation), the surface 11 is coated with a layer of adhesive resin. Nickel flake may be present in the resin, as discussed in copending and commonly assigned application, "Improved Method for Adhesion of Grit to Blade Tips", U.S. Ser. No. 887,509 to Pike.

After the particles 18 are placed on the blade tip 11, the tip 11 is heated to a temperature sufficient to volatilize the resin and to cause the Ni-B layer 32 on the particles 18 to diffuse into the tip surface 11 at regions of point contact. As a result of the diffusion which takes place, a sinter bond 19 is formed between the particles 18 and the tip surface 11. The preferred sintering conditions are in the range of the melting temperature of the Ni-B layer, i.e., about 1,065°-1,095° C. for up to about 8 hours in a non-oxidizing atmosphere. Preferably the sintering is done at a temperature slightly below the Ni-B melting temperature (1,080° C.).

After sintering, each particle 18 is securely bonded to the tip surface 11 as a result of the diffusion of Ni-B into the tip surface. This bond insures that few, if any, of the particles 18 are dislodged from the surface 11 during a subsequent matrix application step, described below. It also insures that the abrasive layer 10 has the necessary abrasive characteristics during engine operation.

Figure 3:
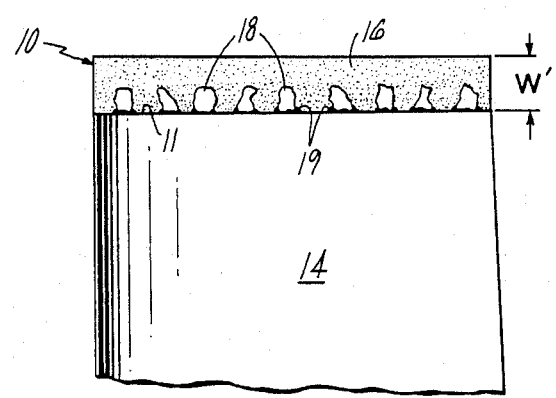
FIG. 3 shows the abrasive layer after application of a metal matrix.

Application of the matrix material 16 is accomplished preferably by vacuum plasma arc spraying, although conventional plasma spraying, physical vapor deposition and electroplating could also be used. The matrix material 16 is applied to a thickness W' as shown in FIG. 3. A nickel base superalloy of the type generally described in the aforementioned Johnson et al patent may be used as the matrix, as may other alloys with good high temperature characteristics (oxidation and corrosion resistance, hot hardness, etc.).

A high strength bond between the abrasive particles 18 and the blade tip 11 is particularly important when the matrix 16 is applied by the preferred vacuum plasma spray, where matrix powder particles are heated in a high temperature, high velocity plasma stream and propelled onto the tip surface 11 at high speeds. It is estimated that the speed of the heated powder particles is in the range of about 200-500 m/sec (670-1,640 ft/sec); the speed of the plasma stream is thought to be at least about two times the particle speed. The sinter bond formed when the Ni-B layer 32 on each particle 18 diffuses into the tip surface 11 is of sufficiently high strength so that only a few of the coated particles 18, if any, are lost from the tip surface 11 during the spray operation. If the bond did not have sufficient strength, an excessive amount of the particles would be dislodged from the tip surface 11 as the matrix layer 16 is applied. The Ni-B coating 32 not only diffuses into the tip surface 11, but it also diffuses into the second metal coating layer 31 on each particle 18, which further strengthens the bond between the particles 18 and the blade tip 11.

An additional benefit due to the use of the coated particles of this invention, and in particular, to the use of the duplex Ni-B/Ni layer, is evident during the preliminary steps of the vacuum plasma spray process. In the application of the matrix material with this process, the blade tip surface 11 must first be cleaned. If the surface 11 is not cleaned, the bond strength between the matrix material 16 and the tip 11 will be unacceptably low. Reverse transfer arc (RTA) cleaning is the preferred method for cleaning the tip surface 11. During the RTA cleaning, the tip surface 11 is sputter cleaned by a high temperature electric arc generated between the surface 11 and the electrode in the plasma spray gun. The temperature of the arc can be high enough to cause some of the Ni-B layer on the abrasive particles to melt, in which case the molten Ni-B wets the intermediate Ni layer, rather than beading up and running off of the particles 18. If the molten Ni-B were to run off the particles 18, they would likely be lost from the blade tip 11 as the RTA cleaning continues. When alumina coated silicon carbide particles are coated only with a Ni-B metal layer, and the Ni-B layer is melted during RTA cleaning, the melted metal beads up on the alumina layer and the particles are easily dislodged from the blade tip surface.

Although the sprayed layer of matrix material 16 will have about 95 percent theoretical density, it may contain some porosity or voids, which could reduce the mechanical properties of the overall abrasive layer 10. To eliminate such voids, the blade 14 is subjected to a hot isostatic pressing (HIP) procedure after application of the matrix material 16. The HIP treatment also enhances the bond between the matrix 16, particles 18, and blade tip 11. For the nickel base superalloy matrix material described in the Johnson patent, a HIP temperature of about 1,100° C. and a gas pressure of about 140 MPa applied for two hours is sufficient. Other hot pressing parameters may be used to consolidate the matrix material 16 and achieve the object of densification and bonding.

Next, the surface of the abrasive layer 10 is machined to produce a smooth, relatively flat surface. Finally, the surface of the abrasive layer 10 is contacted with a chemical etchant or other substance which will attack and remove some of the matrix material 16, causing a portion of each of the particles 18 to project into space. For example, electrochemical machining can be used, as is described in U.S. Pat. No. 4,522,692 to Joslin. This step reduces the matrix thickness to a dimension W, which is about 50-90 percent of the particle dimension T, and results in an abrasive layer 10 having the shape schematically shown in FIG. 1.

The key aspect of the invention is that the duplex nickel-boron/nickel coating layer provides a high strength sinter bond between the abrasive particles 18 and the blade tip surface 11 prior to application of the matrix material 16. After the matrix material 16 is applied, the particles 18 are also held to the tip surface 11 by the matrix 16. The high bond strength achieved with the invention particles is evident from the following example. Hot pressed and crushed silicon carbide particles, nominally about 300 microns (12 mils) in diameter were coated with a 12 micron (0.5 mil) layer of aluminum oxide, in accord with the Johnson patent referenced above. Then, the particles were divided into three groups. The first group was coated with 5 microns (0.2 mil) of electroless Ni-B; the second group was coated with 8 microns (0.3 mils) of electroless Ni-B; the third group was coated with 5 microns of pure nickel and then 5 microns of electroless Ni-B. The sintering characteristics of each group of coated silicon carbide particles to nickel base superalloy test specimens was then evaluated.

In this sintering evaluation, the coated particles were deposited on the surface of the test specimens which was coated with a thin layer of adhesive resin (polystyrene) in a low viscosity carrier which also contained nickel flake. The particles were sintered to the surface of the test specimens at 1,065° C. for 3 hours.

Figure 4:
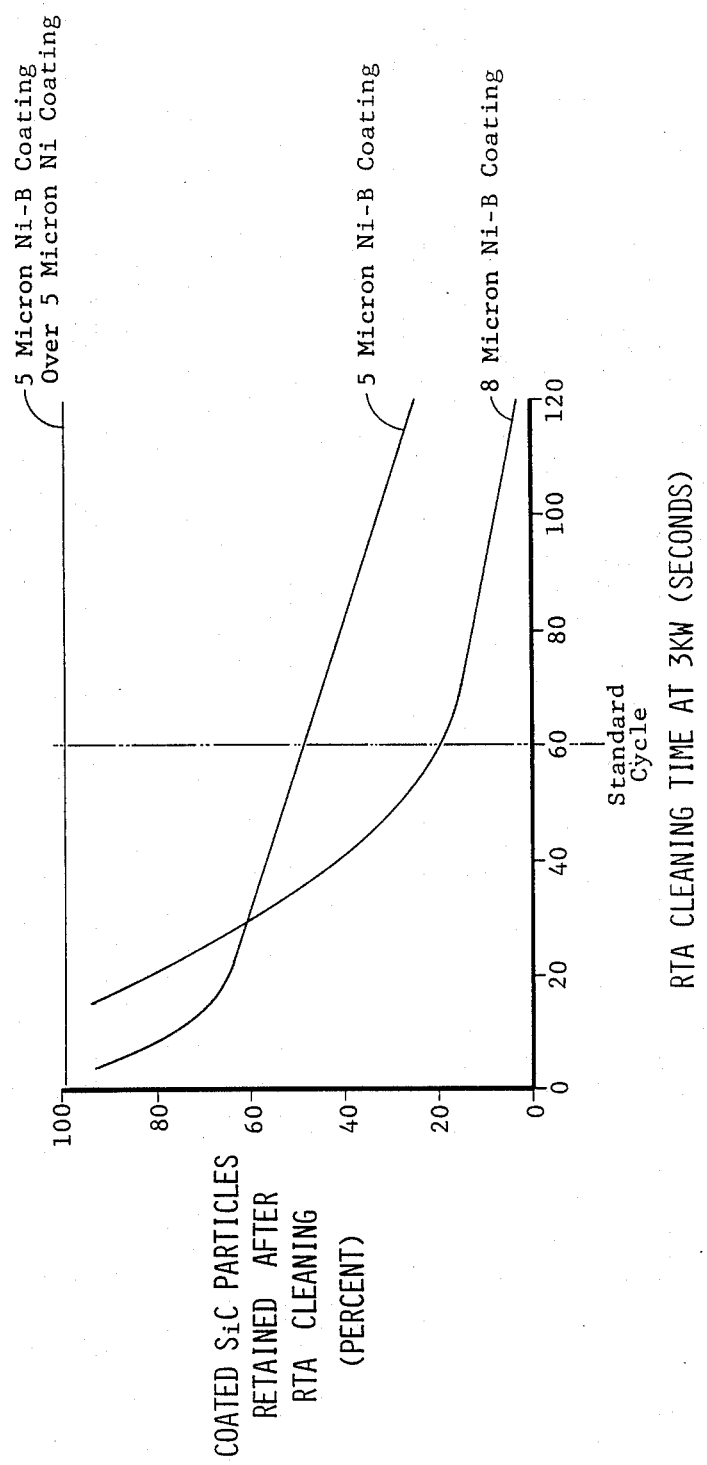
FIG. 4 presents the results of sintering evaluations of coated silicon carbide particles.

The specimen surface was then cleaned by conventional RTA processing in a vacuum plasma spray chamber. A 60 second RTA cleaning at 3 kw is the standard cycle. Table 1 and FIG. 4 show that the use of the Ni-B/Ni duplex metal layer results in a sinter bond with considerably more strength than either of the nickel-boron monolayer coating systems: After the standard 60 second RTA cycle, about 99% of the Ni-B/Ni coated particles were still bonded to the specimen surface, while only about 60% of the particles coated with 5 microns of Ni-B were bonded and 20% of the particles coated with the 8 micron Ni-B were bonded to the surface. After 120 seconds of RTA cleaning, the superiority of the Ni-B/Ni duplex coating layer is even more evident.

In a second sintering evaluation, three groups of coated silicon carbide particles were again evaluated. The first group was coated with 5 microns (0.2 mil) of electrolessly deposited pure nickel; the second group coated with 5 microns of electroless deposited Ni-B; the third group coated with 5 microns each of Ni-B over Ni. The cqated particles were then sintered to nickel base superalloy test specimens at temperatures between 1,065° C. (1,950° F.) and 1,095° C. (2,000° F.). After sintering, a 25 gram shear load was applied to the individual particles, and the percent of particles still bonded to the specimen surface after test (relative to the number bonded to the surface before the test) determined. Table 2 shows that the highest strength sinter bond was achieved with the Ni-B/Ni duplex metal coated particles, sintered at 1,080° C. (1,975° F.) for 2 hours. It also shows the extreme sensitivity of the other two coating systems to small variations in sintering temperatures: When the sintering temperature was 1,095° C., only about 2% of the particles coated with the Ni or Ni-B coating systems were bonded after shear load testing. With the invention duplex coating layer, 51% of the particles were still bonded.

Although this invention has been shown and described with respect to a preferred embodiment, it will be understood by those skilled in the art that various changes in form and detail thereof may be made without departing from the spirit and scope of the claimed invention.

TABLE 1

Percent of Particles Retained After Sintering at 1,065° C. for 3 hrs and Reverse Transfer Arc (RTA) Cleaning

| Coating System | RTA Conditions | % Retained |
|---|---|---|
| Ni—B (5 microns) | 3 kw/120 sec | 37 |
| Ni—B (5 microns) | 3 kw/120 sec | 12 |
| Ni—B (8 microns) | 3 kw/120 sec | 4 |
| Ni—B (8 microns) | 3 kw/120 sec | 1 |
| Ni—B/Ni (5 microns/5 microns) | 3 kw/120 sec | 100 |
| Ni—B/Ni (5 microns/5 microns) | 3 kw/120 sec | 99 |

TABLE 2

Percent of Particles Retained After Sintering and Application of 25 Gram Shear Load

| Coating System | Sintering Treatment | | |
|---|---|---|---|
| | 1,065° C. for 3 hrs | 1,080° C. for 2 hrs | 1,095° C. for 20 min |
| Pure nickel | 14% | 9% | 2% |
| Ni—B | 86 | 75 | 2 |
| Ni—B/Ni | 77 | 91 | 51 |

We claim:

1. Metal coated ceramic abrasive particles in the range of about 25 to 1,250 microns, the particles having a duplex metal coating thereon which comprises a first metal coating layer which substantially encapsulates each particle and is selected from the transition metals, high melting temperature noble metals, and alloys thereof; and a second metal coating layer which substantially encapsulates the first coating layer, and is selected from said transition and noble metals and alloys thereof which contain a melting point depressant in sufficient quantity so that the second metal layer melts at a temperature less than the melting temperature of the first metal layer, wherein the second metal layer is capable of significant diffusion into nickel and cobalt base superalloys when heated near its melting temperature and forms no deleterious phases on diffusing into said superalloys, and the second metal layer wets the first metal layer when the second metal layer is molten.

2. The particles of claim 1, wherein the ceramic is selected from the group consisting essentially of silicon carbide, silicon nitride, and SiAlON wherein the second metal layer melts at a temperature at least about 150° C. less than the melting temperature of the first metal layer, and wherein the second metal layer consists essentially of said first metal layer plus said melting point depressant.

3. The particles of claim 2, wherein the ceramic is silicon carbide, the first metal layer is nickel and the second metal layer is a nickel-boron alloy containing between about 1 and 5% boron by weight.

4. The particles of claim 3, further comprising a layer of aluminum oxide between the silicon carbide and the nickel layer.

5. Ceramic particles useful as a dispersoid in a metal matrix, each particle having a multiple layer coating thereon which comprises an oxide coating layer resistant to diffusion or dissolution with the ceramic; and a duplex metal coating layer over the oxide coating layer, the duplex metal coating layer comprising first and second metal layers, the first metal layer having a melting temperature above about 1,100° C., and resistant to diffusion or dissolution with the oxide coating layer, and the second metal layer having a melting temperature less than about 1,100° C., said second metal layer wetting the first metal layer when molten.

6. The ceramic of claim 5, wherein the oxide coating layer is resistant to diffusion or dissolution with the ceramic at temperatures up to at least about 1,100° C.; the first metal layer being resistant to diffusion or dissolution with the oxide layer at temperatures up to at least about 1,100° C.; and the second metal layer having a melting temperature at least about 150° C. lower than the melting temperature of the first metal layer, said second metal layer consisting essentially of said first metal layer and a melting point depressant.

7. An abrasive layer on the tip surface of a gas turbine engine blade, the layer containing spaced apart ceramic particles in a metal matrix, wherein the ceramic particles are each sinter bonded to the blade surface and the matrix fills in the regions between the particles, wherein each particle has an oxide monolayer and a duplex metal coating layer thereon, wherein the oxide monolayer does not react with the ceramic and substantially encapsulates each particle; and the duplex metal coating layer comprises first and second metal layers, the first metal layer not reacting with the ceramic and substantially encapsulating each particle, and the second metal layer diffused with the blade surface.

8. The abrasive layer of claim 7, wherein the ceramic is silicon carbide, the oxide layer is aluminum oxide, the first metal layer is nickel and the second metal layer is a nickel-boron alloy.

9. Silicon carbide particles having a size in the range of about 25–1,250 microns, and having a 5–25 micron thick layer of aluminum oxide, a 2–8 micron layer of nickel over the aluminum oxide coating, and a 2–8 micron layer of nickel-boron over the nickel coating, the nickel-boron coating containing between 1–5 weight percent boron.

* * * * *